US008659800B2

(12) United States Patent
Mizumukai

(10) Patent No.: US 8,659,800 B2
(45) Date of Patent: Feb. 25, 2014

(54) FACSIMILE SENDING SYSTEM INCLUDING A PLURALITY OF FACSIMILE DEVICES AND A SERVER SENDING FIRST SENDING DATA TO THE PUBLIC LINE CONTINUOUSLY FOLLOWING SENDING OF A SECOND SENDING DATA TO A SPECIFIC DESTINATION AS AN IDENTICAL SENDING JOB

(75) Inventor: Wataru Mizumukai, Gifu-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1499 days.

(21) Appl. No.: 11/905,231

(22) Filed: Sep. 28, 2007

(65) Prior Publication Data

US 2008/0080015 A1    Apr. 3, 2008

(30) Foreign Application Priority Data

Sep. 29, 2006   (JP) .................. 2006-267568

(51) Int. Cl.
*H04N 1/32* (2006.01)
(52) U.S. Cl.
USPC ......................................... 358/442; 358/1.15
(58) Field of Classification Search
USPC .................................................. 358/400–475
See application file for complete search history.

(56) References Cited

U.S. PATENT DOCUMENTS

| | | | | |
|---|---|---|---|---|
| 6,449,062 | B1 * | 9/2002 | Endo | 358/400 |
| 6,825,947 | B1 | 11/2004 | Asai | |
| 2002/0054371 | A1 * | 5/2002 | Tanimoto | 358/440 |
| 2002/0059383 | A1 * | 5/2002 | Katsuda | 709/206 |
| 2003/0107776 | A1 * | 6/2003 | Maeda | 358/402 |
| 2004/0085571 | A1 * | 5/2004 | Hulan et al. | 358/1.15 |
| 2004/0218225 | A1 * | 11/2004 | Kim | 358/400 |
| 2005/0099651 | A1 * | 5/2005 | Kimura et al. | 358/1.15 |
| 2005/0190404 | A1 * | 9/2005 | Nakamura | 358/1.15 |
| 2006/0013220 | A1 * | 1/2006 | Niikura | 370/389 |
| 2007/0130365 | A1 * | 6/2007 | Rebert et al. | 709/238 |

FOREIGN PATENT DOCUMENTS

| | | |
|---|---|---|
| JP | 05-136973 A2 | 6/1993 |
| JP | 7-023161 A | 1/1995 |
| JP | 9-233292 | 9/1997 |
| JP | 11-275337 A | 10/1999 |

(Continued)

OTHER PUBLICATIONS

Japanese Office Action, with English translation, issued in Japanese Patent Application No. JP 2006-267568, mailed Dec. 9, 2008.
JP Office Action dtd Apr. 14, 2009, JP Appln. 2006-267568.
JP Office Action dtd Jul. 7, 2009, JP Appln. 2006-267568, English translation.

*Primary Examiner* — Qian Yang
*Assistant Examiner* — Marcellus Augustin
(74) *Attorney, Agent, or Firm* — Banner & Witcoff, Ltd.

(57) ABSTRACT

A facsimile sending system is provided with facsimile devices and a server. Each facsimile device scans a document, is capable of inputting information concerning a destination, creates sending data including data of the scanned document and the input information, sends the sending data, receives sending data sent from the server, sends the sending data sent from server to a destination determined based on the information included in its sending data, and sends its own facsimile device's running status to the server. The server receives the sending data sent from each facsimile device, receives the running status sent from each facsimile device, selects one facsimile device from the plurality of the facsimile devices based on the running status of each facsimile device, and sends the sending data sent from the facsimile device to the selected facsimile device.

9 Claims, 9 Drawing Sheets

| Data Identifying Information | Destination | Control Number Information | Status Information |
|---|---|---|---|
| 0001 | ○○○-△△△△ | 1000 | Sending Has Ended |
| 0002 | △△△-○○○○ | 1111 | Sending Has Ended |
| 0003 | ○○○-○○○○ | 1020 | |
| 0004 | △△△-△△△△ | | |
| ⋮ | ⋮ | ⋮ | ⋮ |

| ID | Control Number Information | Source ID Number Information | Destination Information | Status Information |
|---|---|---|---|---|
| 20 | 1234 | 50 | ○○○-△△△△ | Currently Sending |
| 30 | 1589 | 20 | △△△-□□□□ | Currently Sending |
| 40 | 1020 | 50 | ○○○-○○○○ | Currently Sending |
| ⋮ | ⋮ | ⋮ | ⋮ | ⋮ |

(56) References Cited

FOREIGN PATENT DOCUMENTS

| JP | 2000-216929 | 8/2000 |
| JP | 2001-345989 A | 12/2001 |
| JP | 2002-330251 A | 11/2002 |
| JP | 2003-304374 | 10/2003 |
| JP | 3627720 | 3/2005 |
| JP | 2005-136459 | 5/2005 |
| JP | 2005-191733 | 7/2005 |
| JP | 3750005 B2 | 3/2006 |

* cited by examiner

FIG. 10A

| Data Identifying Information | Destination | Control Number Information | Status Information |
|---|---|---|---|
| 0001 | ○○○-△△△△ | 1000 | Sending Has Ended |
| 0002 | △△△-○○○○ | 1111 | Sending Has Ended |
| 0003 | ○○○-○○○○ | 1020 | |
| 0004 | △△△-△△△△ | | |
| ⋮ | ⋮ | ⋮ | ⋮ |

FIG. 10B

| ID | Control Number Information | Source ID Number Information | Destination Information | Status Information |
|---|---|---|---|---|
| 20 | 1234 | 50 | ○○○-△△△△ | Currently Sending |
| 30 | 1589 | 20 | △△△-□□□□ | Currently Sending |
| 40 | 1020 | 50 | ○○○-○○○○ | Currently Sending |
| ⋮ | ⋮ | ⋮ | ⋮ | ⋮ |

FACSIMILE SENDING SYSTEM INCLUDING A PLURALITY OF FACSIMILE DEVICES AND A SERVER SENDING FIRST SENDING DATA TO THE PUBLIC LINE CONTINUOUSLY FOLLOWING SENDING OF A SECOND SENDING DATA TO A SPECIFIC DESTINATION AS AN IDENTICAL SENDING JOB

CROSS-REFERENCE TO RELATED APPLICATION

This application claims priority to Japanese Patent Application No. 2006-267568, filed on Sep. 29, 2006, the contents of which are hereby incorporated by reference into the present application.

BACKGROUND OF THE INVENTION

1. Field of the Invention

The present invention relates to a facsimile sending system and a facsimile device. The facsimile sending system referred to here is a system comprising a server and a plurality of facsimile devices connected with the server.

2. Description of the Related Art

A facsimile device set forth in Japanese Patent Application Publication No. 2005-191733 is connected to two lines. This facsimile device is capable of sending data by utilizing one line even in the case where the other line is being utilized in sending or receiving. That is, this facsimile device sends data by utilizing a free line of a plurality of lines connected to the one facsimile device.

BRIEF SUMMARY OF THE INVENTION

However, in the case where all lines connected to the one facsimile device are utilized, it is necessary to perform either the time-consuming options that a user who wants to send data waits until the sending has ended, or that the user checks each of other facsimile devices to search for another facsimile device having a free line among a plurality of facsimile devices, and to then send the facsimile. Moreover, for example, a plurality of facsimile devices is provided in an office or the like. In this case, some facsimile devices may be store data to be sent in a memory. However it is difficult for a user to know which facsimile device will complete to send the stored data most rapidly.

The present specification aims to present a technique whereby data can be sent rapidly by a server splitting sending data among a plurality of facsimile devices.

A facsimile sending system taught in the present specification is provided with a plurality of facsimile devices and a server. Each facsimile device includes a scanning device, an inputting device, a data creating device, a first facsimile side sending device, a facsimile side receiving device, a second facsimile side sending device and a running status sending device. The scanning device scans a document. The inputting device is capable of inputting information concerning a destination. The data creating device creates sending data including data of the document scanned by the scanning device and the information input to the inputting device. The first facsimile side sending device sends the sending data created by the data creating device to the server. The facsimile side receiving device receives sending data sent from the server. The second facsimile side sending device sends, via a public line, the sending data received by the facsimile side receiving device to a destination determined based on the information included in its sending data. The running status sending device sends its own facsimile device's running status to the server. The running status may include a sending state of the facsimile device. The running status may include states such as a receiving state, a document reading state, etc., other than the sending state. The server includes a server side receiving device, a running status receiving device, a selecting device and a server side sending device. The server side receiving device receives the sending data sent from each facsimile device. The running status receiving device receives the running status sent from each facsimile device. The selecting device selects one facsimile device from the plurality of the facsimile devices based on the running status of each facsimile device. The server side sending device sends the sending data received by the server side receiving device to the facsimile device selected by the selecting device.

In this facsimile sending system, the sending data concerning the document scanned by the scanning device is sent to the server. The server selects a facsimile device from the plurality of facsimile devices connected to the server based on the running status of each facsimile device, and sends the sending data to the selected facsimile device. Since the server selects the facsimile device, the user can rapidly complete sending data without searching for a facsimile device that is capable of sending.

BRIEF DESCRIPTION OF THE DRAWINGS

FIG. 10A shows a sending registration information table stored in a storage of the multi-function device.

FIG. 10B shows a control table concerning a running status of the multi-function device, this control table being stored in a storage of the server.

DETAILED DESCRIPTION OF THE PREFERRED EMBODIMENT (Embodiment)
(Overall Configuration of the Facsimile Sending System)

Figure 1:
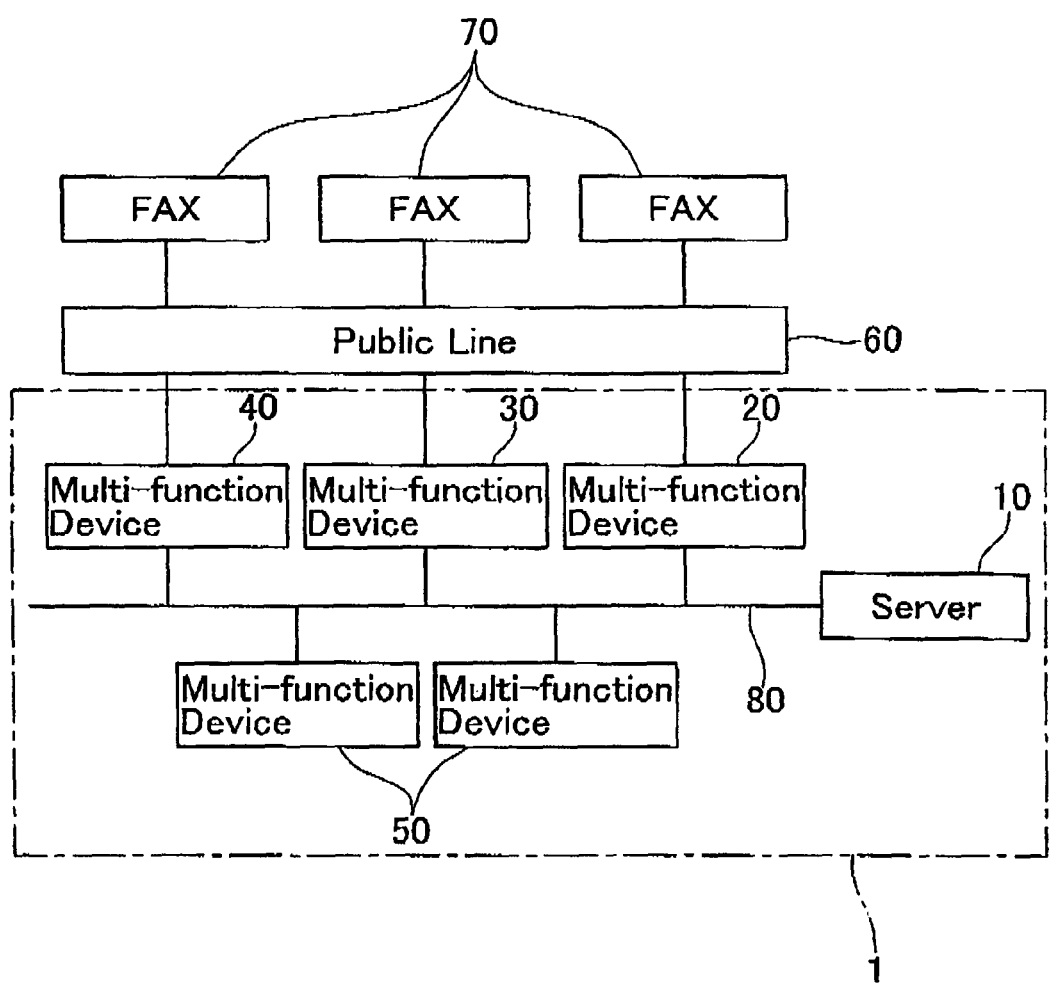
FIG. 1 shows a schematic diagram of a facsimile sending system.

An embodiment will be described with reference to the figures. FIG. 1 is a schematic diagram of a facsimile sending system 1 of the present embodiment. The facsimile sending system 1 includes a server 10, multi-function devices 20, 30, 40 and 50, and a LAN circuit 80 connecting all these. A public line 60 is connected to the multi-function devices 20, 30 and 40. The facsimile sending system 1 is connected via the public line 60 to an external facsimile device 70, etc.

(Configuration of the Server)

Figure 2:
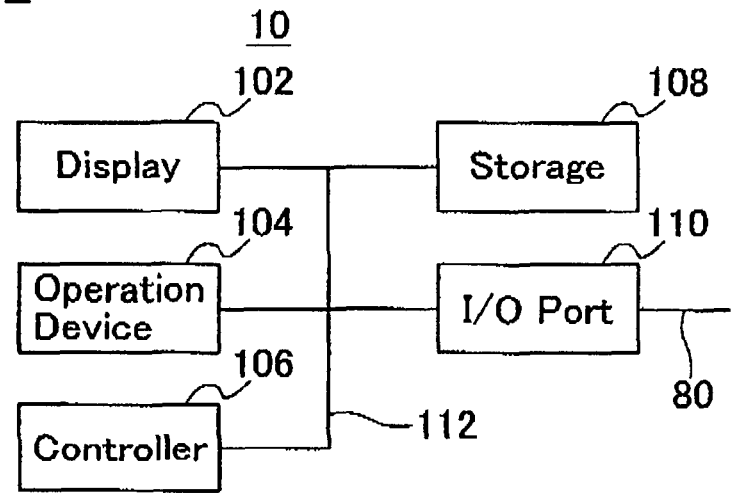
FIG. 2 shows a block view of the configuration of a server.
Figure 3:
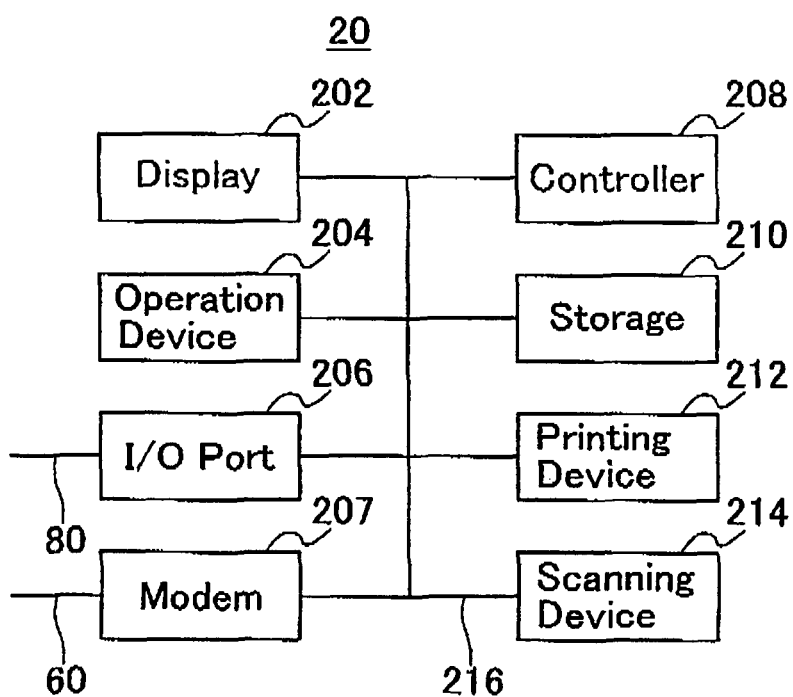
FIG. 3 shows a block view of the configuration of a multi-function device.

As shown in FIG. 2, the server 10 includes a display 102, an operation device 104, a controller 106, a storage 108 and an 1,0 port 110. These are connected by a bus 112. The display 102 is a known display such as, for example, a liquid crystal display or the like. The display 102 displays the various items, of information. The operation device 104 includes a keyboard, mouse, etc. An operator of the server 10 can input various items of information to the server 10 by operating the operation device 104. The controller 106 includes a CPU or the like. The controller 106 exerts general control of the processes executed by the server 10. The storage 108 includes a ROM, RAM, hard disk, etc. The storage 108 stores programs to be executed by the controller 106. The LAN circuit 80 (see FIG. 1) is connected with the I/O port 110. The server 10 is connected with the multi-function devices 20, 30, 40, 50, etc. via the LAN circuit 80.

(Configuration of the Multi-function Devices connected with the Public line)

The multi-function device 20 includes a display 202, an operation device 204, an I/O port 206, a modem 207, a controller 208, a storage 210, a printing device 212 and a scanning device 214. These are connected by a bus 216. The display 202 is a known display, such as a liquid crystal display or the like. The display 202 is disposed in a position where it is easily viewed by a user (for example, on an upper surface of the multi-function device 20). The display 202 receives various items of information from the controller 208, and displays the various items of information. The operation device 204 includes a plurality of keys. The operation device 204 is disposed in a position where it is easily operated by the user (for example, in a position adjacent to the display 202). The user can input various operation commands such as scanning a document, copying a document, etc., to the multi-function device 20 by operating the keys. The I/O port 206 is a known I/O port such as a LAN port or the like. The LAN circuit 80 is connected with the I/O port 206. The multi-function device 20 is connected via the LAN circuit go with the server 10 or other multi-function devices 30, 40, and 50, etc. within the system 1. The multi-function device 20 can send and receive data to and from the server 10 or the other multi-function devices 30, 40, and 50. Furthermore, the multi-function device 20 can send and receive facsimile data to and from the external facsimile device 70, etc. via the public line 60 utilizing an NCU housed in the modem 207.

The controller 208 includes a CPU or the like. The controller 208 exerts general control of the processes executed by the multi-function device 20. The storage 210 includes a ROM, RAM, EEPROM, etc. The storage 210 stores programs to be executed by the controller 208. The printing device 212 is a known printing device such as an ink jet type or laser type. The printing device 212 is capable of printing onto printing paper an image or letters corresponding to image data The printing function of the multi-function device 20 is thus realized. The printing device 212 is capable of printing onto printing paper letters, etc. that have been received by facsimile. Furthermore, the printing device 212 is capable of printing onto printing paper image data obtained by the scanning device 214 (to be described). The copy function of the multi-function device 20 is thus realized. The scanning device 214 includes a CCD (Charge Coupled Device) or CIS (Contact Image Sensor). The scanning device 214 scans a document and creates image data.

Furthermore, the multi-function device 20 can send data sent from the server 10 to the external facsimile device 70, etc. via the public line 60. The facsimile function of the multi-function device 20 is thus realized. The multi-function devices 30 and 40 have the same configuration as the multi-function device 20. Consequently, a detailed description thereof is omitted.

(Configuration of the Multi-function Device not connected with the Public line)

The multi-function device 50 comprises a display, an operation device, an I/O port, a controller, a storage, a printing device, a scanning device, etc. that are the same as those of the multi-function device 20. The LAN circuit 80 is connected with the I/O port of the multi-function device 50. Furthermore, the multi-function device 50 does not include a modem connected with the public line 60. The multi-function device 50 can send data to and receive data from the devices of the system 1 via the LAN circuit 80. However, the multi-function device 50 cannot send data to and receive data from the external facsimile device 70, etc. directly via the public line 60.

(Facsimile Sending Procedure)

Figure 9:
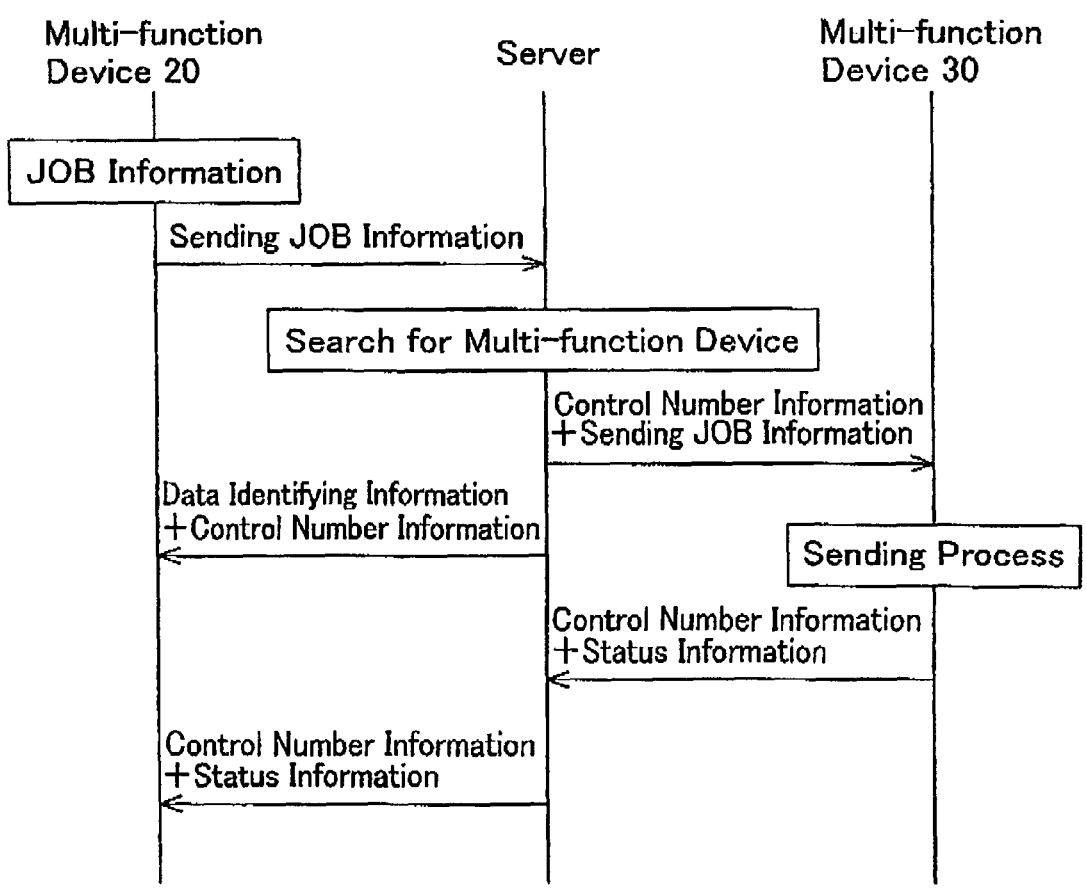
FIG. 9 shows a time chart showing a process of sending a facsimile utilizing the facsimile sending system.

Next, the procedure of sending data to the external facsimile device 70, etc. using the facsimile sending system 1 will be described with reference to the figures. An outline of a process of sending a facsimile by the facsimile sending system 1 will be described with reference to FIG. 9. FIG. 9 is a description showing the multi-function device 30 sending a facsimile of sending data created by the multi-function device 20. Vertical lines shown in FIG. 9 refer to the multi-function device 20, the server 10, and the multi-function device 30. The vertical lines show a time sequence from top to bottom. Furthermore, the sequence of arrows shows the direction in which information is sent. The programs set forth on cache vertical line are processes executed by the multi-function device 20, the server 10, or the multi-function device 30 respectively.

First, the multi-function device 20 scans a document by the scanning device 214. A facsimile number of the destination (hereafter referred to as destination information) of the document that has been read is input to the multi-function device 20 utilizing the operation device 204. Sending JOB information (sending data) is sent to the server 10. This sending JOB intonation includes the image data from the document that was scanned, the destination information, and sending source identifying information that identifies the multi-function device 20 and that was read from the storage 210 (for example, a facsimile number of the multi-function device 20. Hereafter this is referred to as source information). Moreover, the following is also sent to the server 10 with the sending JOB information: data identifying information that is fixed to the sending JOB information, and ID number information (for example, an IP address or the like) of the multi-function device 20. Furthermore, the multi-function device 20 stores this data identifying information and destination information in a sending registration information table of the storage 210. As shown in FIG. 10A, apart from the data identifying information and the destination information, the following can be stored in the sending registration information: control number information and status information sent by the server. These are matched with the data identifying information and the destination information.

From the sending JOB information received from the multi-function device 20, the server 10 determines a control number. The server 10 determines the control number such that this control number is different from each of the control numbers previously determined by the server 10. The server 10 sends the determined control number and the data identifying information included in the sending JOB information to the multi-function device 20. Furthermore, the server 10 searches for and selects a multi-function device for sending the image data that is included in the sending JOB information. The server 10 selects a multi-function device that is currently sending or preparing for sending a facsimile to the same destination as the destination number information. included in the sending JOB information, or a multi-function device capable of sending data (for example, a multi-function device that is currently waiting to send), etc. The server 10 sends, to the multi-function device 30 that has been selected, the sending JOB information received from the multi-function device 20, and the control number information determined by the server 10. Furthermore, the server 10 stores running status information in a control table provided in the storage 108-The running status information includes the control number information, the ID number information of the multi-function device 20, and the destination information included in the sending JOB information. As shown in FIG. 103, running status information of each multi-function device is related to each ID number information of the multi-function device that have a modem in the control table. The running status information is stored in a predetermined column that corresponds to the ID number information provided in the control table (i.e. the ID number information of the multi-function device 30 (this being the multi-function device that was selected as the multi-function device to send the facsimile)). Furthermore, information concerning the status information sent from the multi-function device 30 can also be stored in the control table. When the sending JOB information is sent to the multi-function device 30, the server 10 adds "currently sending" to the status information in the column that corresponds to the multi-function device 30. The multi-function device for sending the image data included in the sending JOB information that was received from the multi-function device 20 is sought for by referring to this control table.

The multi-function device 30 sends the image data included in the sending JOB information received from the server 10 to the destination corresponding to the destination number information included in the sending JOB information. The multi-function device 30 sends, to the server 10, status information (running status) concerning the data sending, for example, sending ended, sending failure, etc., with the control number information that was received with the sending JOB information.

When the server 10 receives the status information from the multi-function device 30, the server 10 makes the corresponding portions of the control table blank. The corresponding portions are the control number information, the ID number information of the sending source (the multi-function device 20), and the destination information corresponding to the ID number information of the multi-function device 30. Furthermore, the server 10 sends the following to the multi-function device 20: the status information that was received from the multi-function device 30 and the control number information.

The multi-function device 20 registers the status information received from the server 10 in the sending registration information table that is storing the corresponding sending registration information. If there is image data that was commanded to be sent from the multi-function device 20, the user can verify a sending log such as the sending condition and sending result, etc., by reading the sending registration information table stored in the storage 210 of the multi-function device 20 regardless of which multi-function device has actually sent the facsimile of the image data.

Figure 4:
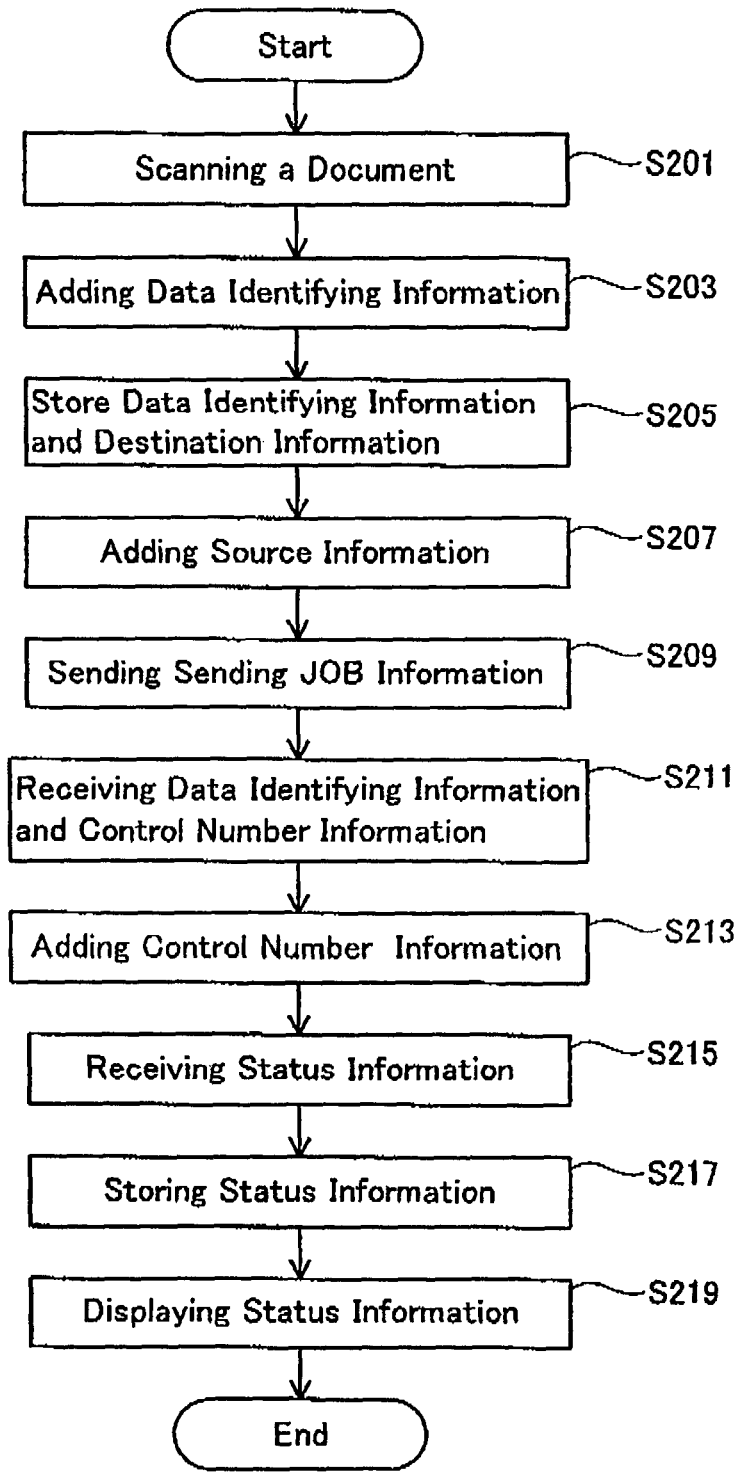
FIG. 4 shows a flow chart showing a process of a controller of the multi-function device in which sending data is registered.

Next, the process of the controller 208 in the case where data is registered for the multi-function device 20 to send will be described with reference to FIG. 4. When the destination information and a command to scan a document are input from the operation device 204, the controller 208 causes the document to be scanned by the scanning device 214, and to be converted into image data (step S201). Furthermore, a facsimile number input from the operation device 204 is set as the destination information. The controller 208 adds the data identifying information to the image data of the document that has been scanned (step S203).

The controller 208 stores the data identifying information and the destination information corresponding to the image data in the sending registration information table of the storage 210 (step S205). The controller 208 adds the source information to the image data (step S207). The controller 208 sends the following to the server 10 (step S209): the image data, the destination information, the source information (hereafter referred to as the sending JOB information), the data identifying information, and the ID number information of the multi-function device 20.

The controller 208 receives the data identifying information and the control number information from the server 10 (step S211). The controller 208 adds the control number information to the sending registration information table that has the data identifying information corresponding to the data identifying information sent from the server 10 (step S213). The controller 208 receives the status information with the control number information sent by the server 10 (step S215). The controller 208 adds the status information to the sending registration information table corresponding to the server control number information that was received, and stores this in the storage 210 (step S217) The controller 208 displays the destination information and the status information on the display 202 (step S219). The facsimile registration process displayed in FIG. 4 can be executed by the multi-function devices 20, 30, 40, and 50. That is, the facsimile registration process can also be executed by the multi-function device 50 that is not connected to the public line.

Figure 5:
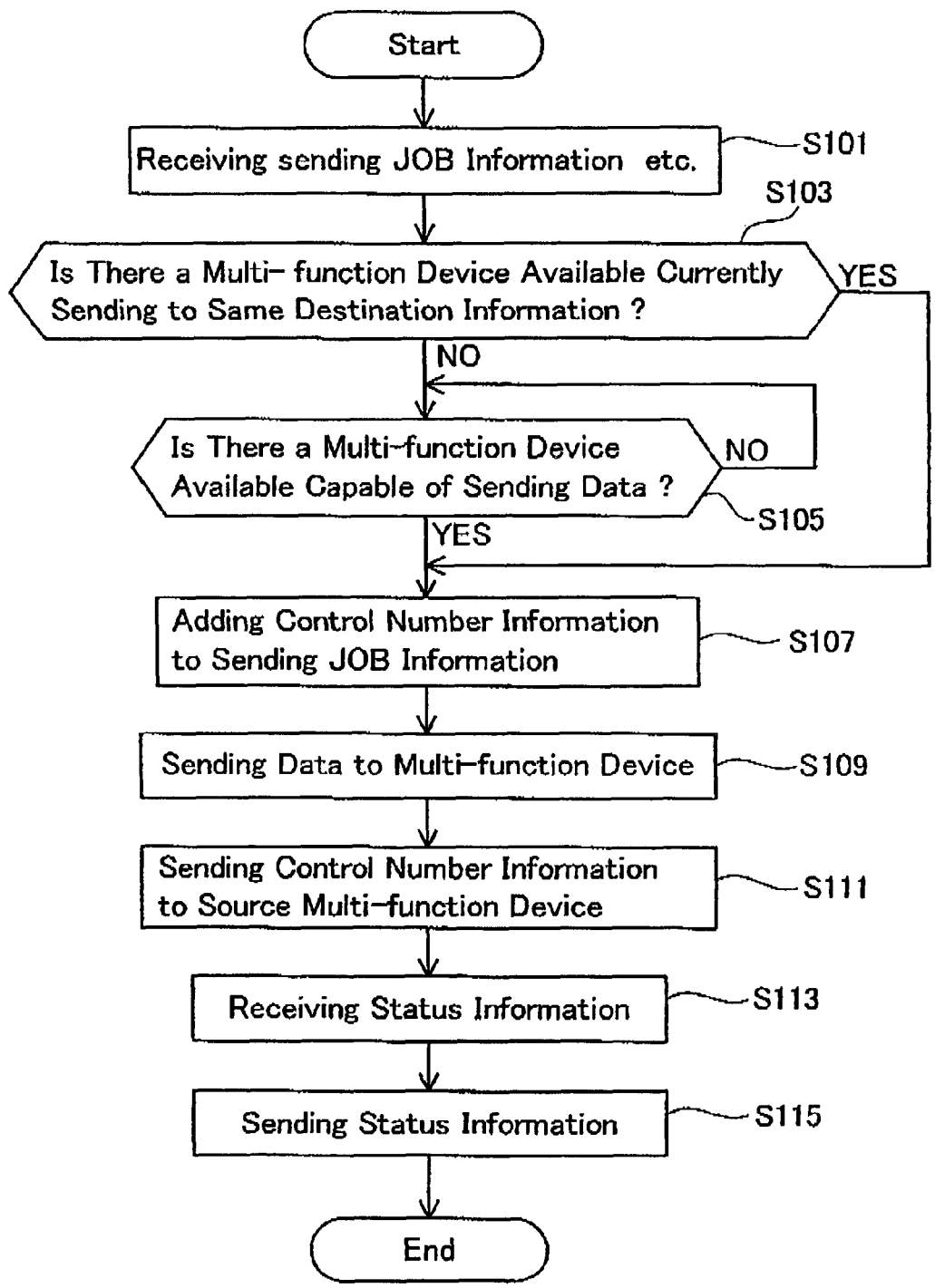
FIG. 5 shows a flow chart showing a process of a controller of the server when data is to be sent.

Next, a process of the controller 106 of the server 10 in the case where data is sent from the multi-function device 20 will be described with reference to FIG. 5. The controller 106 receives the sending JOB information, the data identifying information and the ID number information of the multi-function device 20 that were all sent from the multi-function device 20 (step S101). The controller 106 searches among the multi-function devices connected to the server 10 for a multi-function device that is currently sending or preparing for sending data to the same destination as the destination information received in step S101 (step S103). Specifically, it determines whether there is control number information being stored that is the same as the destination information received in step S101 among the destination information stored in the running status information of the control table. In the case where there is a multi-function device that is currently sending to the same destination (Yes in step S103), the process proceeds to step S107.

In the case where there is not a multi-function device that is currently sending or preparing for sending to the same destination (step S103 is No), the controller 106 searches for a multi-function device capable of sending data (step S105). Specifically, the is determined on the basis of whether there is a blank column of the status information stored in the running status information of the control table. Moreover, the server 10 may receive the running status of the multi-function device from each of the multi-function devices at a predetermined time, and may update this received running status as the running status information. The search processes of steps S103 and S105 can thus be executed. In the case where a multi-function device capable of sending data cannot be found (step S105 is No), the controller 106 repeats the search of step S105 until a multi-function device capable of sending data is found. When a multi-function device capable of sending data is found (step S105 is Yes), the process proceeds to step S107.

In the description below, an example is described in which the multi-function device 30 is found in step $105 as a multi-function device capable of sending data. In step S107, the controller 106 adds the control number information to the sending JOB information Then, the controller 106 sends the sending JOB information to the multi-function device 30 (an example of a multi-function device capable of sending data) (step S109). The controller 106 sends the data identifying information and the control number information to the multi-function device 20 according to the ED number information that was received (step S111). Furthermore, the controller 106 registers the control number information, the ID number information of the multi-function device 20 that is the sending source, and the destination information included in the sending JOB information that have been sent to the multi-function device 30 in the columns corresponding to the ID number information of the multi-function device 30 of the control table.

The controller 106 receives the control number information and the status information from the multi-function device 30 (this status information is either information showing that the sending has ended or information showing that the sending has failed) (step S113). When the status information is received, the predetermined information of the running status information of the control table concerning the multi-function device 30 that is the sending source of this status information is updated to blank columns. Furthermore, the controller 106 sends the control number information and the status information that have been received to the multi-function device 20 (step S115). The controller 106 ends the present process. Moreover, in the case where a plurality of items of destination information is included in the sending JOB information, the process of steps S103 to S115 is performed for each of these items of destination information.

Next, a process of a controller of the multi-function device 30 in receiving data sent from the server, and in sending data to a destination facsimile device via the public line 60 will be described with reference to FIG. 6. The multi-function device 30 receives the sending JOB information including the control number information sent from the server 10 (step S301). The controller adds page number intonation to the image data that has been sent (step S303). The controller verifies whether data is currently being sent (step S305). In the case where a facsimile is not being sent (step S305 is No), the process proceeds to step S3 11. In the case where data is currently being sent (step S305, is Yes), the process proceeds to step S307. In step S307, a batch process is performed for sending the image data included in the sending JOB information received in step S301 continuously following the sending of the image data that was determined in step S305 as data currently being sent. Next, the process proceeds to step S308, and whether or not the batch process of step S307 was performed normally is declined. In the case where it is determined that the batch process was performed normally (step S308 is Yes), the process proceeds to step S311. In the case where it is determined that the patch process was not performed normally (step S308 is No), the sending JOB information is put into a waiting state (step S309) so as to send the image data thereof from the multi-function device 30 as a separate sending JOB from the image data that is currently being sent. Then the process proceeds to step S327.

In step S311, the controller performs the sending process in accordance with the destination information included in the sending JOB information that was received. At this juncture, in the case where data is being sent to the exterior, the controller deletes sending source information included in the sending JOB information when there is a command from the operation device of multi-function device 30, and then performs the sending. In particular, in the case where the sending source of the sending JOB information is a multi-function device that does not have a modem, such as the multi-function device 50, it is not possible to receive facsimile data from an external destination. In this type of case, the source information may be deleted and the facsimile sent, It is possible to avoid in advance the case where the external sending source traces the sending source added to the data that was received, and sends a reply. The controller confirms whether data sending has ended (step S313). If sending has ended (step S313 is Yes), the process proceeds to S315. If sending has not ended (step S313 is No), the process proceeds to S317. In step S315, the controller adds the control number information to status information showing that sending has ended and sends this to the server 10, and the process proceeds to step S327.

In step S317, the controller verifies the number of times the sending JOB information which has not yet finished being sent is redialed The number of times of redialing has been set in advance The controller confirms whether the number of times of redialing is exceeded. In the case where the number of times of redialing exceeds a predetermined number of times (step S317 is No), the controller adds the control number information to status information showing that sending has failed and sends this to the server 10 (step S319). When this status information has been sent to the server 10, the process proceeds to step S327. In the case where the number of times of redialing has not reached the predetermined number of times (step S317 is Yes), the process proceeds to step S321. In step S321, the controller puts the sending into the waiting state, and waits for a predetermined interval to elapse before resuming redialing (step S323 is No). Then, when a predetermined interval has elapsed since performing the most recent facsimile sending process (step S323 is Yes), the process returns to step S311, and the controller again performs the sending process.

In step S327, the controller verifies whether there is sending JOB information that is waiting to be sent. That is, the controller verifies whether there is sending JOB information that the batch process was not performed in step S307. In the case where there is sending JOB information (step S327 is Yes), the controller returns to step S311, and again performs the facsimile sending process. In the case where there is no waiting sending JOB information (step S327 is No), the controller ends the process.

Figure 6:
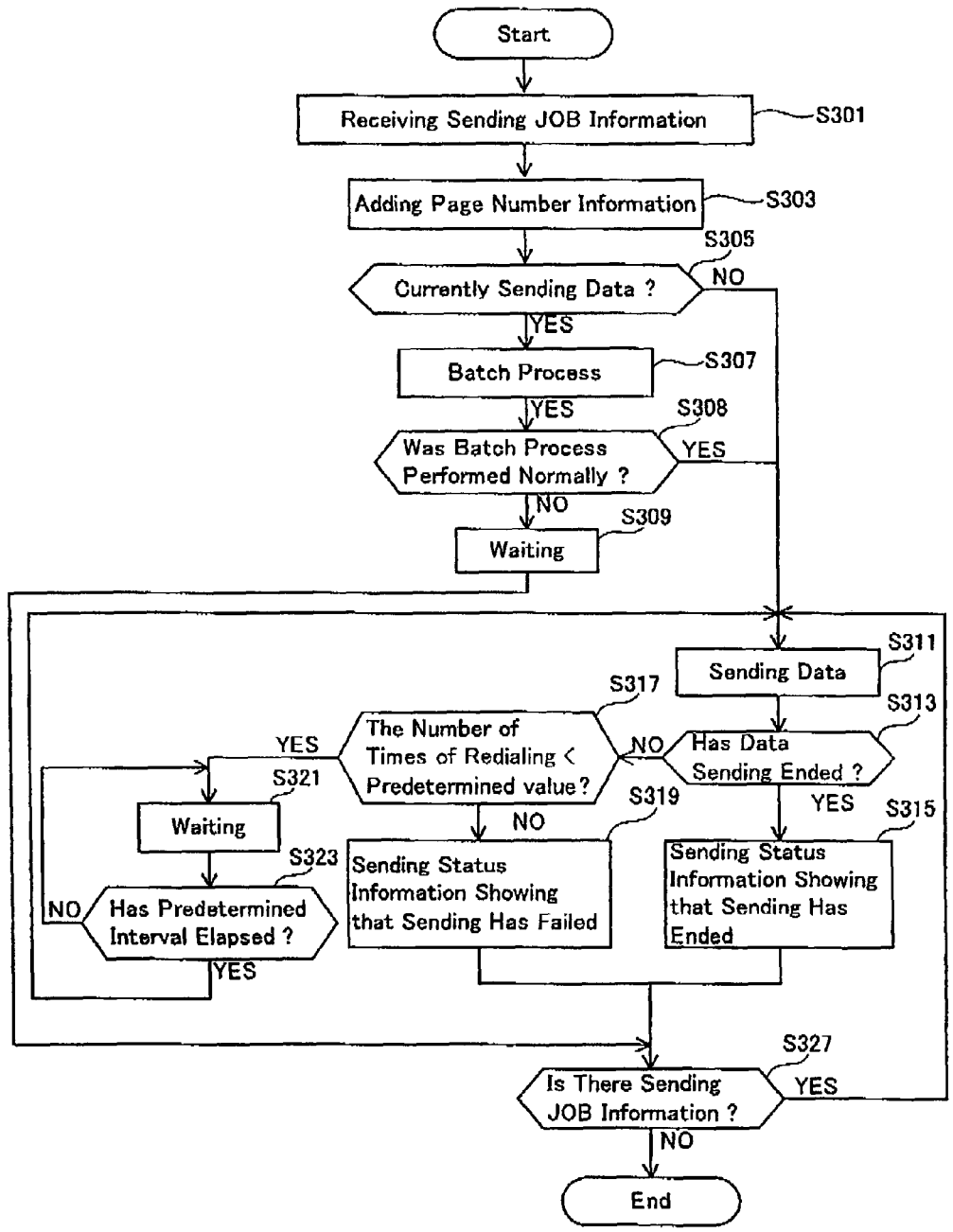
FIG. 6 shows a flow chart showing a process of the controller of the multi-function device when data is to be sent to the exterior.

The facsimile sending process shown in FIG. 6 can be executed by the multi-function devices 20, 30, and 40. The sending JOB information registered by the multi-function device 50 that is not connected to the public line is sent via the server 10 to any of the multi-function devices 20, 30, or 40. The multi-function devices 20, 30, or 40 that have received the sending JOB information send the data to the external facsimile device 70, etc. via the public line. The multi-function device 50 that is not connected to the public line is thus also able to send data to the external facsimile device 70, etc.

In the aforementioned facsimile sending system 1, the server 10 matches and adds the control number information to the sending JOB information communicated between the multi-function device and the server 10. This control number information is sent to the multi-function device that sent the sending JOB information to the server 10 and the multi-function device that received the sending JOB information from the server 10. It is thus possible to distinguish that the status information (information showing that the sending has ended or information showing that the sending has failed (see step S315, S319)) corresponds to which sending JOB information by adding the control number information to the status information.

The server 10 receives the status information from the multi-function device that has sent the data The server 10 understands the running status of the multi-function device by reading the status information. The server 10 determines that the multi-function device is currently sending data until it receives the status information from the multi-function device that has sent the data.

(Variant)

Figure 7:
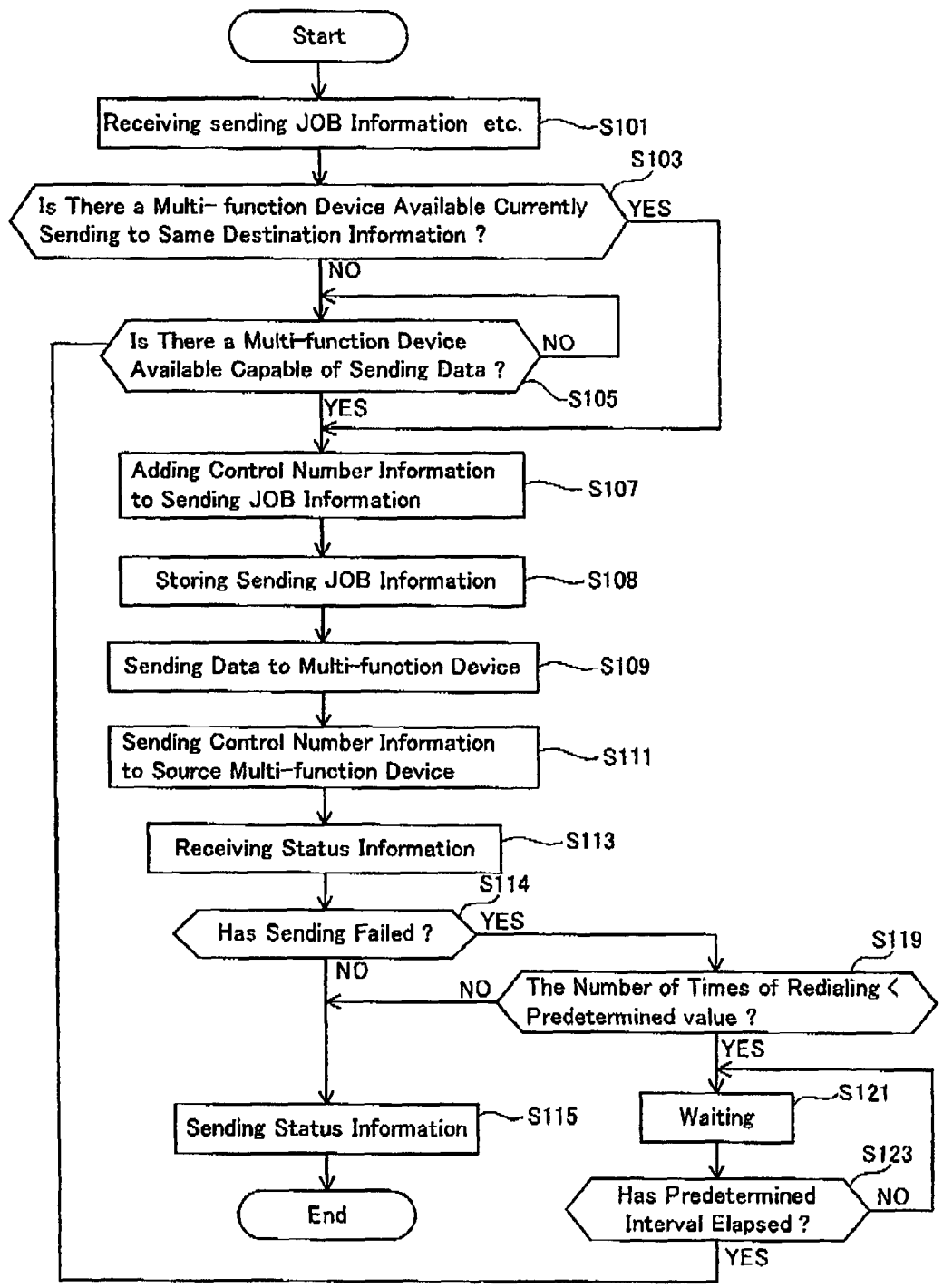
FIG. 7 shows a flow chart showing a process of the controller of the server in the case where a redial process is to be executed by the server.

In the above embodiment, the facsimile sending redial process is performed by the multi-function device 30 that is actually sending data. However, the redial process may equally well be executed by the server 10. Below, a process of the server 10 in the case where the server 10 executes the redial process is described. FIG. 7 is a flow chart showing a process of the controller 106 of the server 10. In FIG. 7, in the case where the controller 106 performs the same process as in FIG. 5, the description is given utilizing the same steps, and a description thereof is omitted.

In step S107, the control number information is added to the sending JOB information. The controller 106 stores the sending JOB information and the control number information in the control table (FIG. 10B) of the storage 108 (step S108). Here, the sending JOB information and the number of times of redialing are registered as the running status information. For each facsimile sending, the number of times of redialing is updated by adding "I". Then steps S109 to S113 are executed. In the case where the status information received from the multi-function device 30 in step S113 is not status information showing that sending has failed (step Si 14 is No), the controller 106 sends the status information to the multi-function device 20 (step S115). In the case where the status information received from the multi-function device 30 in step S113 is status information showing that sending has failed (step S114 is Yes), the controller 106 verifies the number of times of redialing of the sending JOB information that corresponds to the status information (step S119). In the case where the redialing has been executed a predetermined number of times (step S119 is No), the process proceeds to step S115. The controller 106 sends the status information showing that sending has failed to the multi-function device 20.

In the case where the number of times of redialing is less than the predetermined number of times, the controller 106 waits to send the sending JOB information until a redialing interval has elapsed (step S121). The redialing interval is verified (step S123). In the case where an interval greater than or equal to the redialing interval has elapsed (step S123 is Yes), the process returns to step S105, and a multi-function device capable of sending a facsimile is sought. If the received status information of the running status information is that sending has failed, and the number of times of redialing is less than or equal to the predetermined number of times, status information showing 'sending failure' is registered. In the case where sending is completed, the predetermined information of the running status information is aide blank.

It is possible to select the most suitable multi-function device to perform sending each time a multi-function device capable of sending is sought. Furthermore, it is understood by means of repeating the redial process that the plurality of the multi-function devices cannot send data. As a result, it is possible to determine that there is a cause for a sending error in the sending JOB information, such as the destination information being wrong or the like.

Figure 8:
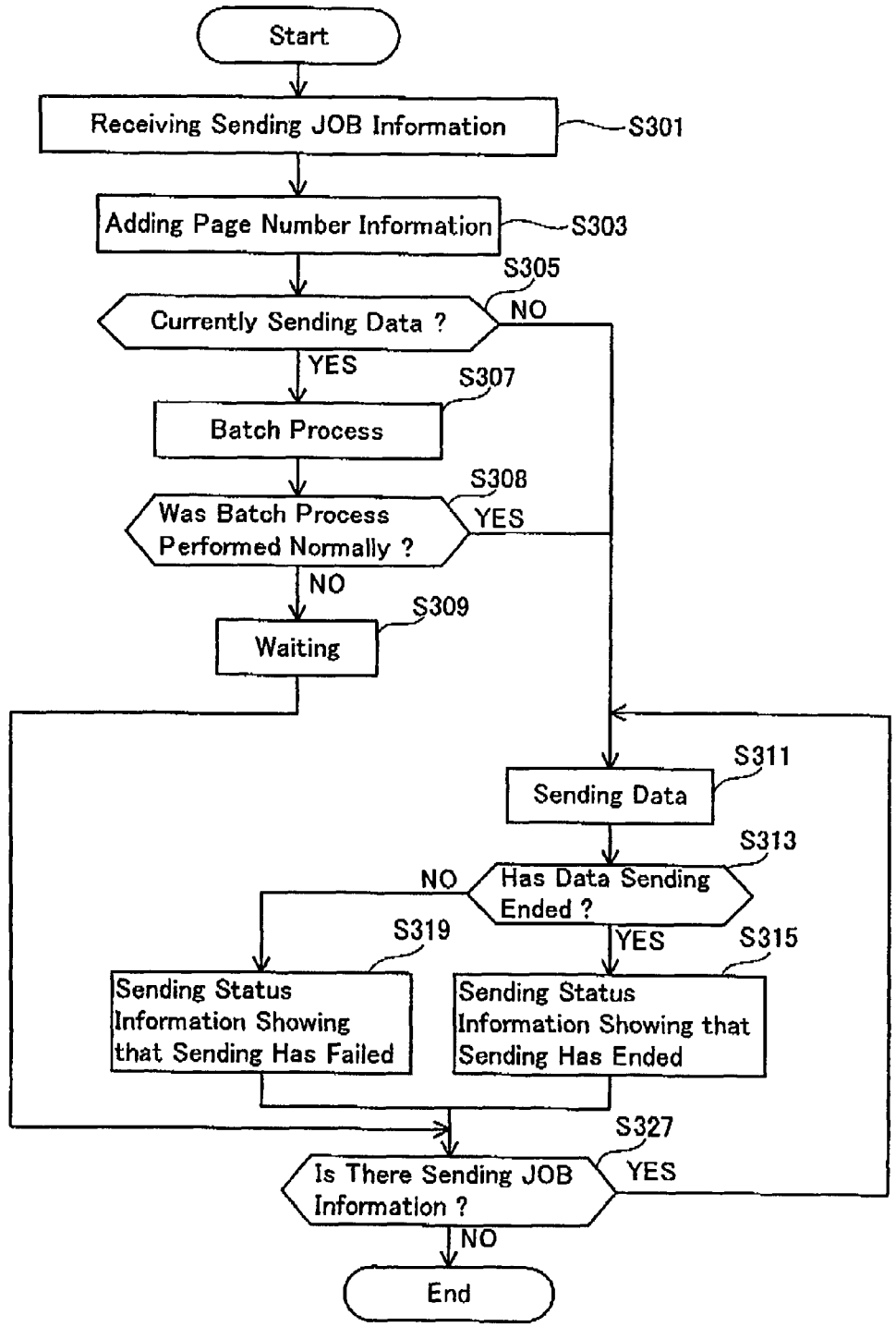
FIG. 8 shows a flow chart showing a process of the controller of the multi-function device in the case where the redial process is to be executed by the server.

FIG. 8 is a flow chart showing a process of the controller of the multi-function device 30. In FIG. 8, in the case where the multi-function device 30 executes the same process as in FIG. 6, the description is given utilizing the same steps, and a description thereof is omitted. Since the multi-function device 30 does not perform the redial process, in the case where sending failed in step S313 (step S313 is No), the process proceeds to step S319, and status information showing that sending has failed is sent to the server 10.

According to this facsimile sending system, the server can control the redial process. Furthermore, in the case where data is to be sent to the exterior, the controller of the multi-function device may be capable of adding the source information included in the sending JOB information, and sending data. Furthermore, it is possible for the multi-function device to store in advance the sending source information or a representative number to which a response is desired from the exterior sending source, this source information coming from the sending source This source information or representative number may be added as the source information, and the data sent. Furthermore, the data may be sent not only without the source information, but also without adding page numbers.

In the facsimile sending system 1, data scanned by the multi-function device 50 that is not connected to the public line 60 can also be sent to an external destination via the public line 60. As a result, it is not necessary to provide the same number of public lines as the number of facsimile devices or multi-function devices having the facsimile function. It is thus possible to provide a greater number of facsimile devices or multi-function devices having the facsimile function than the number of public lines. Furthermore, it is possible to execute the sending rapidly by performing in advance the process of scanning the document to be sent.

Generally, in the case where a facsimile device is to send data to an external facsimile device, the data is made to conform to a communication type that the destination is capable of receiving, then the data is sent. For this purpose, the facsimile device performs a connection process to each destination to inquire about the communication type that the destination is capable of receiving.

In the facsimile sending system 1, the server 10 searches for a multi-function device that is currently sending or preparing for sending to a destination that is the same as the destination included in the received sending JOB information. In the case where there is a multi-function device that is currently sending or preparing for sending to the same destination, the server 10 sends the sending JOB information to this multi-function device. When the multi-function device receives the sending JOB information that is for the same destination as the destination to which it is currently sending, the multi-function device continuously sends the data it is currently sending and the data that it has newly received The multi-function device thus does not need to make contact anew, for the data that it has newly received, to inquire about the communication type that the destination is capable of receiving. It is consequently possible to reduce the time for inquiring about the receiving data type. The facsimile sending process can thus be made faster.

Moreover, in the facsimile sending system 1, in the case where a plurality of destination information is included in the sending JOB information, i.e. in the case of multiple address forwarding transmission, the server 10 searches, for each destination information, for a multi-function device that is currently sending to a destination that is the same as the destination information. It is thus possible to search for the most suitable multi-function device for each destination, and have each multi-function device perform the facsimile sending process. In the facsimile sending system 1, the facsimile sending process can be performed rapidly even in the case of multiple address forwarding transmission Furthermore, in the facsimile sending system 1, in the case where data is to be sent from the multi-function device, the multi-function device is capable of deleting the source information. It is thus possible to delete the source information from the data in the case where giving the source information to the external destination is not desired.

Furthermore, in the facsimile sending system 1, the multi-function device adds the page number information to each item of data that is sent. That is, if new data is received while facsimile sending is currently being performed, it is possible to add the page number information to the new data that was received independently of the page number information added to the data currently being sent. The page number information is thus received at the exterior (the destination facsimile device or the like) in a state of having been added independently even if the new data that was received and the data currently being sent are sent continuously. The pages being numbered from the data currently being sent and the new data that is received are not one sequentially numbered set. As a result, the data can be distinguished from each other, even if the data is sent continuously to the exterior.

In the case where the multi-function device 20 (30, 40) are not sending data to the exterior, the controller 208 (the controller of the multifunction device 30, 40) may not send data to the server 107 but to the exterior via the public line 60.

Furthermore, the server 10 may also be provided with devices such as a printing device, scanning device, modem, etc. other than those described above. In other words, the server 10 may be a multi-function device that has a server function. In this case, the controller 106 of the server 10 searches for multi-function devices including itself that are currently sending data to the exterior. Furthermore, the server 10 may be contained within at least one of the multi-function devices 20, 30, 40, and 50.

Specific examples of the present invention are described above in detail, but these examples are merely illustrative and place no limitation on the scope of the patent claims. The technology described in the patent claims also encompasses various changes and modifications to the specific examples described above.

For example, the above embodiment was described utilizing a multi-function device. However, this may equally well be a facsimile device.

Furthermore, the technical elements explained in the present specification and drawings provide technical value and utility either independently or through various combinations. The present invention is not limited to the combinations described at the time the claims are filed. Further, the purpose of the example illustrated by the present specification and drawings is to satisfy multiple objectives simultaneously, and satisfying any one of those objectives gives technical value and utility to the present invention.

What is claimed is:

1. A facsimile sending system, comprising:
a plurality of facsimile devices including a first facsimile device and a second facsimile device different from the first facsimile device; and
a server,
wherein the second facsimile device is connected to the server and a public line, and the second facsimile comprises:
a scanning device that scans a document;
an operation device configured to receive specific destination information concerning a destination;
a processor; and
memory storing computer-readable instructions that, when executed by the processor, cause the processor to operate as:
a data creating unit that creates first sending data including data of the document scanned by the scanning device and the specific destination information received by the operation device;
a second facsimile device side sending unit that sends the first sending data created by the data creating unit to the server;
wherein the server comprises:
a processor; and
memory storing computer-readable instructions that, when executed by the processor, cause the processor to operate as:
a server side receiving unit that receives the first sending data sent from the second facsimile device;
a selecting unit that selects one facsimile device from the plurality of the facsimile devices; and
a server side sending unit that sends the first sending data received by the server side receiving unit to the facsimile device selected by the selecting unit,
wherein the first facsimile device is connected to the server and the public line, and the first facsimile device comprises:
a processor; and
memory storing computer-readable instructions that, when executed by the processor, cause the processor to operate as:
a first facsimile device side receiving unit that receives the first sending data sent from the server;
a first facsimile device side sending unit that sends, via the public line, the first sending data received by the first facsimile device side receiving unit to the specific destination concerning the specific destination information included in the first sending data; and
a running status sending unit that sends a sending result of the first sending data to the server,
wherein
in a case where the first facsimile device is currently sending second sending data different from the first sending data to the specific destination concerning the specific destination information, the selecting unit selects the first facsimile device,
the server side sending unit sends the first sending data to the first facsimile device in a case where the first facsimile device is selected by the selecting unit,
in a case where the first facsimile device side receiving unit receives the first sending data sent from the server while the first facsimile device side sending unit is sending the second sending data to the specific destination the first facsimile device side sending unit sends, via the public line, the first sending data continuously following the sending of the second sending data to the specific destination as an identical sending job with the second sending data, and the memory of the server stores additional computer-readable instructions that, when executed by the processor of the server, further cause the processor to provide a running status receiving unit that receives the sending result of the first sending data from the first facsimile device in a case where the server side sending unit sends the first sending data to the first facsimile device.

2. The facsimile sending system as in claim 1, further comprising one or more additional facsimile devices, wherein each additional facsimile device is configured to be connected to the server, and comprises:

a scanning device that scans a document;

an operation device configured to receive destination information concerning a destination;

a processor; and memory storing computer-readable instructions that, when executed by the processor, cause the processor to operate as:

a data creating unit that creates sending data including data of the document scanned by the scanning device and the information received by the operation device; and an additional facsimile device side sending unit that sends the sending data created by the data creating unit to the server, wherein the server side receiving unit receives the sending data sent from the additional facsimile device, and the server side sending unit sends the sending data received by the server side receiving unit to the facsimile device selected by the selecting unit.

3. The facsimile sending system as in claim 1, wherein the running status sending unit further sends running status of the first facsimile device including information concerning the specific destination to which the first facsimile device side sending unit is currently sending the second sending data, the running status receiving unit receives the running status sent from the first facsimile device, and the selecting unit selects, based on the running status of the first facsimile device, the first facsimile device currently sending or preparing for sending the second sending data to the specific destination included in the first sending data received by the server side receiving unit.

4. The facsimile sending system as in claim 3, wherein in a case where the first facsimile device side receiving unit receives the first sending data including the specific destination information concerning the specific destination while the first facsimile device side sending unit is sending the second sending data to the specific destination, the first facsimile device side sending unit sends the first sending data without sending an inquiry to the specific destination about a receiving format after sending the second sending data.

5. The facsimile sending system as in claim 4, wherein the memory of the first facsimile device stores additional computer-readable instructions that, when executed by the processor of each facsimile device, further cause the processor of each facsimile device to operate as a page number adding unit that adds a page number to the first sending data to be sent by the first facsimile device side sending unit, and in the case where the first facsimile device side receiving unit receives the first sending data while the first facsimile device side sending unit is sending the second sending data, the page number adding unit adds a page number to the first sending data independently from a page number of the second sending data.

6. The facsimile sending system as in claim 3, wherein the running status receiving unit further receives a running status sent from each facsimile device of the plurality of facsimile devices, and in a case where there are no facsimile devices currently sending or preparing for sending any sending data to the specific destination included in the first sending data received by the server side receiving unit, the selecting unit selects, based on the running status of each facsimile device of the plurality of facsimile devices, a facsimile device currently not sending any sending data via the public line.

7. The facsimile sending system as in claim 3, wherein in a case where a plurality of destinations is included in the first sending data received by the server side receiving unit, the selecting unit selects a facsimile device with respect to each destination information included in the first sending data received by the server side receiving unit.

8. The facsimile sending system as in claim 1, wherein the memory of the second facsimile device stores additional computer-readable instructions that, when executed by the processor of the second facsimile device, further cause the processor to operate as a source adding unit that adds source information concerning a source to the first sending data created by the data creating unit, and the first facsimile device side sending unit deletes the source information concerning the source from the first sending data received by the first facsimile device side receiving unit and sends the first sending data.

9. The facsimile sending system as in claim 1, further comprising an additional facsimile device configured to be connected to the server and not to be connected to the public line, wherein the additional facsimile device is configured separately from the plurality of facsimile devices and the server, and the additional facsimile device comprises:

an additional scanning device that scans a document;

an additional operation device configured to receive information concerning a destination;

an additional processor; and additional memory storing computer-readable instructions that, when executed by the processor, cause the processor to operate as:

an additional data creating unit that creates third sending data including data of the document scanned by the additional scanning device, the destination information received by the additional operation device and first sending source identifying information that identifies the additional facsimile device; and an additional facsimile device side sending unit that sends the third sending data created by the additional data creating unit to the server, wherein first sending data created by the data creating unit of the second facsimile device further comprises second sending source identifying information that identifies the second facsimile device, wherein the server side receiving unit additionally receives the third sending data sent from the additional facsimile device, and in a case where the third sending data is received by the server, the first facsimile device side sending unit of the first facsimile device deletes the first sending source identifying information included in the third sending data prior to sending the third sending data via the public line, and in a case where the first sending data is received by the server, the first facsimile device side sending unit of the first facsimile device sends the first sending data with the second sending source identifying information via the public line.

\* \* \* \* \*